Oct. 28, 1941.                D. O. SPROULE                2,260,347
                         ECHO SOUNDING APPARATUS
                         Filed July 22, 1937         3 Sheets-Sheet 1
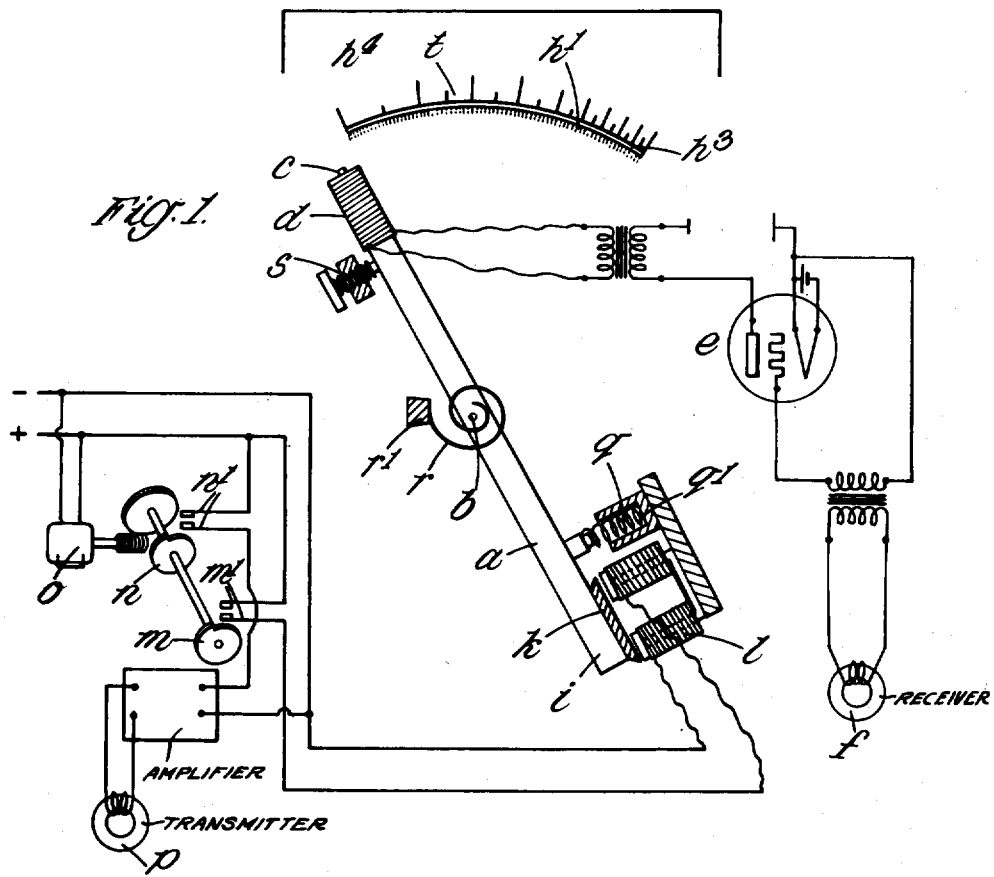
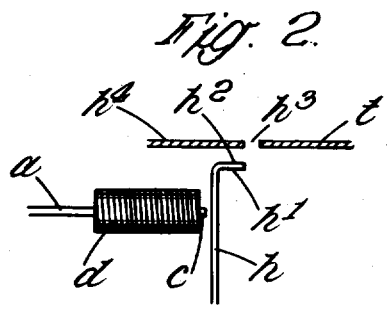
Donald Orr Sproule
INVENTOR

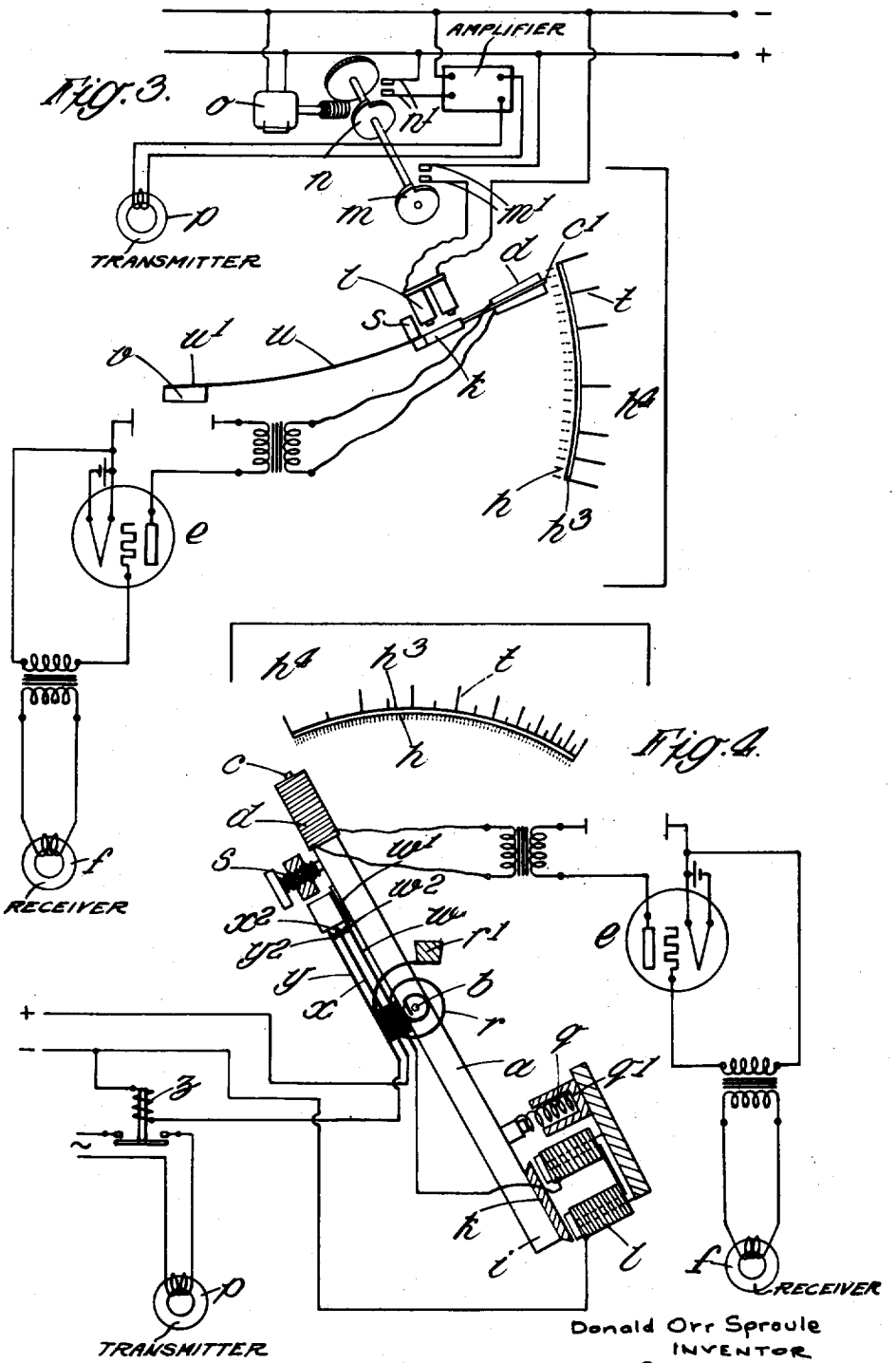

Oct. 28, 1941. D. O. SPROULE 2,260,347
ECHO SOUNDING APPARATUS
Filed July 22, 1937

Donald Orr Sproule
INVENTOR

Patented Oct. 28, 1941

2,260,347

UNITED STATES PATENT OFFICE 2,260,347

ECHO SOUNDING APPARATUS

Donald Orr Sproule, London, England, assignor of one-third to Henry Hughes & Son, Limited, London, and one-third to Arthur Joseph Hughes, Chigwell Row, Essex, England Application July 22, 1937, Serial No. 155,066
In Great Britain July 30, 1936

5 Claims. (Cl. 177—386)

This invention relates to improvements in echo sounding apparatus and has for its principal object to simplify such apparatus and to reduce the weight thereof thereby enabling such apparatus to be applied more readily to aircraft for the determination of altitude.

Another object of the invention is to provide means whereby the indicating device can be dissociated mechanically from the rest of the apparatus and be installed in any convenient position, where it can be energised by electric currents flowing through conductors, whilst maintaining the necessary synchronisation.

A further object of the invention is to provide means whereby the indications representing distances can be so spaced as to enhance the accuracy of reading.

According to this invention the improved apparatus comprises a deflectible member, impulse means for deflecting said member in synchronism with the sound pulse emitter, restoring means for said member, and means associated with said member adapted to indicate the angular position thereof when excited by an electrical pulse from the echo pulse receiver, said member in some cases having inertia controlled switching means for operating the impulse means and the sound pulse transmitter in proper sequence and in correct time relation.

In the drawings which by way of example show a variety of arrangements and constructions:

Figure 1 shows diagrammatically one form of a time indicating device for use with echo sounding apparatus;

Figure 2 is a fragmentary side elevation of the pulse magnet, a cantilever, the scale and mask;

Figure 3 shows a modified arrangement; and

Figure 4 shows diagrammatically an arrangement including inertia controlled switching means;

Figure 5:
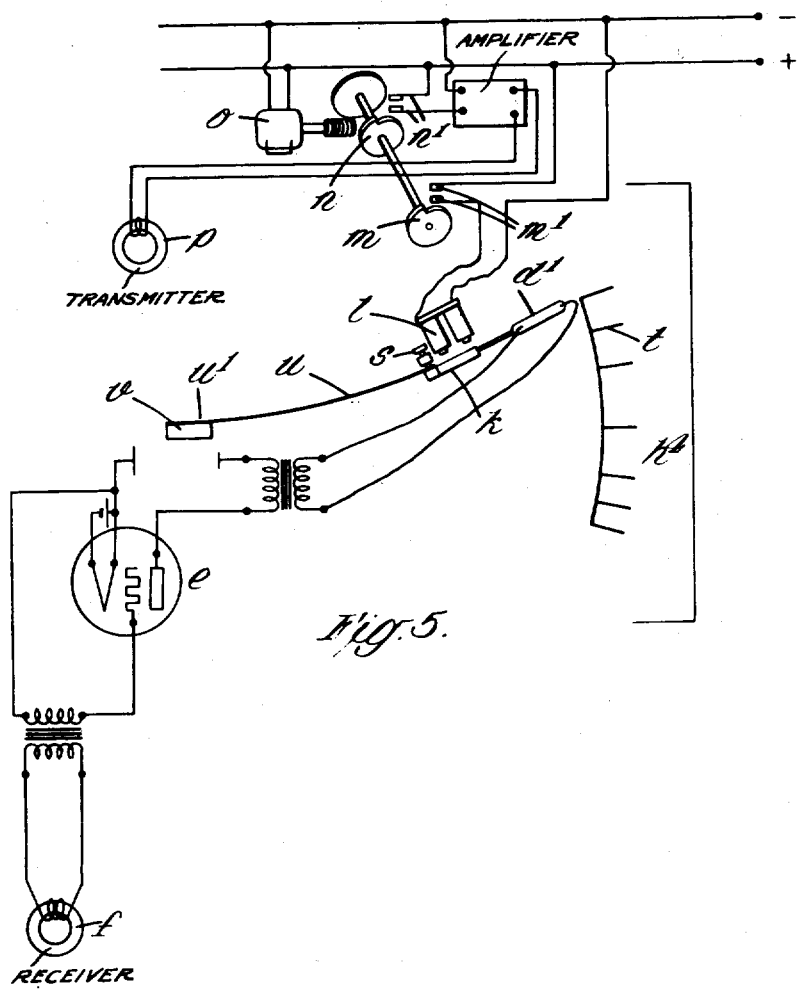
Figure 5 shows a modification of Figure 3 in which a neon tube cooperates with a scale as an indicating device.

In its simplest form the device operates as an indicator energised under remote control in conjunction, if necessary, with other indicators and/or recorders and then as shown in Figure 1 it comprises a bar $a$ having a pivot $b$ at or near to its centre, said pivot $b$ being so selected as to introduce the minimum of friction.

The end $c$ of the bar $a$ is provided with an electrical winding hereinafter called the pulse magnet $d$, said winding being energised from time to time by electrical pulses from a thermionic amplifier $e$ (with or without initial pulse suppression means) excited by the echo pulse receiver $f$.

In proximity with the path of the pulse magnet $d$ a plurality of elastic cantilevers $h$ similar to the arrangement disclosed in my copending application, Serial No. 71,339, now Patent No. 2,129,155, dated September 6, 1938 of magnetic material is arranged as a curved series, the free end of each cantilever $h$ being bent over at an angle as shown in Figure 2 and being whitened or silvered on its external surface $h^2$ so that exhibition of $h^2$ through the slot $h^3$ in the mask $h^4$ enables any movement of any cantilever $h$ when disturbed by the magnetic flux in the pulse magnet $d$ to be detected relatively to the scale $t$ upon the outside of the mask $h^4$.

The other end $i$ of the bar $a$ is provided with an armature $k$, for example of soft iron, arranged to be attracted by a fixed electromagnet hereinafter called the timing magnet $l$, the winding of which is energised by electrical currents controlled by switch cam $m$ operated by the motor $o$ of the sound pulse transmitter $p$.

In order that impulses may be imparted to the bar $a$ and cause it to oscillate, two spring systems are provided viz: a system having an impulse spring $q$ mounted between the bar $a$ and an abutment $q^1$ so arranged that it is compressed by the bar $a$ when the timing magnet $l$ is energised by current flowing from the positive of the mains through the contact springs $m^1$, closed by the cam $m$ due to rotation of the motor $o$ and through the winding of the timing magnet $l$ to the negative of the mains, and a system having a restoring spring $r$, one end of which is mounted on the fixed abutment $r^1$ and the other end on the bar $a$ so arranged as to urge the bar $a$ to move and bring the armature $k$ thereon into proximity with the timing magnet $l$.

In construction the moving parts are balanced to reduce the effect of external accelerations and the mass and elastic factors are suited to the periodic time of operation, air resistance and friction is reduced as much as possible and an adjustable stop $s$ is provided to limit the free movement of the bar $a$ as required.

In operation, when starting from rest, the bar $a$ may be inclined with the pulse magnet $d$ somewhat behind the zero of the scale $t$ and in contact with the impulse spring $q$ by the action of the restoring spring $r$.

Just before the moment of emission of a sound pulse from the transmitter $p$ due to closing of the contact springs $n^1$ by the cam $n$ operated by the motor $o$ the timing magnet $l$ is energised, attracts the armature $k$ and stresses the impulse spring $q$. At or shortly before the instant of the emission of a sound pulse the supply of current to the timing magnet $l$ is interrupted due to the separation of the contact blades $m^1$ by rotation of the cam $m$ and the impulse spring $q$ delivers its energy to the bar $a$ causing it to swing and stress the restoring spring $r$.

During the travel of the bar $a$ the pulse magnet $d$ moves close to the array of elastic cantilevers $h$ displacing those in proximity thereto when an electrical pulse from the amplifier $e$ of the echo pulse receiver $f$ is delivered.

When the energy imparted to the bar $a$ by the impulse spring $q$ has been transferred to the restoring spring $r$ the bar $a$ comes to rest and is then urged by the spring $r$ to return to its initial position where it is held by the timing magnet $l$, which meanwhile has been energised by the closing of the contact springs $m^1$ due to the continued rotation of the cam $m$ by the motor $o$ until the next sound pulse is transmitted.

In an alternative construction as shown in Figure 3, the bar $a$ is replaced by an elastic cantilever $u$ having a pulse magnet $d$ upon the free end $c^1$ thereof, said cantilever being mounted by the end $u^1$, remote to the pulse magnet $d$, on an abutment $v$ and being limited in travel when stressed by the stop $s$.

In this arrangement the armature $k$ for the timing magnet $l$ is arranged in proximity to the pulse magnet $d$, the timing magnet $l$ being dispositioned appropriately and energised by electrical current controlled by the contact blade $m^1$ actuated mechanically through the cam $m$ by the motor $o$ as described in relation to Figure 1.

As in the arrangement shown in Figure 1, the pulse magnet $d$ is energised when the amplifier $e$ is excited by the echo pulse receiver $f$ and the array of cantilevers $h$ will have to have its configuration modified to be parallel to the path of the end $c^1$ of the member $u$.

Figure 5 shows an arrangement similar to Figure 3 in a general way but the pulse magnet $d$, pole piece $c^1$, the elastic cantilevers $h$ and the slot $h^3$ is omitted. To obtain indications with such an arrangement there is provided a neon tube $d^1$ which cooperates with the scale $t$ and is connected to the thermionic amplifier $e$ so that the said tube $d^1$ is illuminated when an echo pulse is received.

Inasmuch as the deflectible or oscillating bar $a$ or its equivalent cantilever $u$ has a definite periodic time, it may be employed to control the sound pulse transmitter thus eliminating the driving motor $o$ and reducing the weight of the apparatus as a whole.

To this end the oscillating bar $a$ is provided with inertia operated switches having suitably adjusted periodic times as shown in Figure 4 so that when the bar $a$ is brought to rest by the impulse spring $q$, the resilient pendulum $w$ moves away from the pad $w^1$ and effects electrical connection through the contacts $w^2$ and $x^2$ thus establishing an electrical circuit from the positive of the mains through the blades $x$ and $w$ and the winding of the timing magnet $l$ to the negative of the mains.

Further movement of the pendulum $w$ brings the contact $x^2$ into electrical connection with the contact $y^2$ thus establishing an electrical circuit from the positive of the mains through the blades $x$ and $y$ to the winding $z$ of the contactor for the sound pulse transmitter $p$ and thence to the negative of the mains.

Thus it will be seen that whenever the bar $a$ is arrested by the spring $q$ the sequence of completing the circuit of the timing magnet $l$, the circuit of the sound pulse transmitter $p$ and the release of the timing magnet $l$ are effected all in proper sequence and synchronised.

As explained above the indications are observed easily owing to the distinguishing means $h^2$ on the end of each of the cantilevers $h$ being arranged in proximity with the scale $t$ but masked when at rest and being visible only when displaced.

It will be obvious that by adjusting the impulse imparted to the bar $a$ it will be possible to vary the velocity thereof so that the elastic cantilevers $h$ indicating short (or other specially selected) distances can be spaced more widely than those indicating longer (or other) distances thus increasing the accuracy of observation.

To enable the constructions shown to be described easily the scale $t$ has been located in a plane parallel with the plane of movement of the bar $a$ or cantilever $u$ but obviously it is possible to arrange an instrument embodying the features of this invention with an edge-on scale.

For the purpose of explanation elastic cantilevers $h$ of magnetic material and a pulse magnet $d$ energised electrically have been referred to but it is to be understood that the invention contemplates the substitution of electrostatic, electromechanical or equivalent means for the electromagnetic means when required, alternatively means of a different kind may be used for revealing the position of the oscillating member $a$ or cantilever $u$ at the moment of arrival of the echo pulse, such for example as a flashing light, a galvanometer, or some electrochemical arrangement employed in known echo sounding systems.

I claim:

1. A device for measuring and indicating the time periods between the emission of sound pulses and the reception of echo pulses in echo sounding apparatus having in combination a member constrained to vibrate in a defined path, impulse means for imparting motion to said member in one direction, resilient means for restoring said member to starting position at one end of said path, means for releasably holding said member at starting position, means operated before the emission of a sound pulse to release said member, echo pulse excited means on said member, means for indicating the instant of echo pulse excitation and a scale adjacent to said path by which the angle of the member at the instant of excitation relatively to a datum can be ascertained.

2. An improved visual indicator for echo sounding apparatus having in combination a pivoted bar movable through a path of predetermined length, an impulse spring for imparting motion to said bar, a spring for restoring said bar to a starting position at one end of said path, an electromagnet for holding said bar at starting position, a switch operated before the emission of a sound pulse to interrupt the flow of electrical current through said electromagnet to release said bar, a scale, a series of vibratable similar elements positioned relatively to said scale, echo pulse excited electromagnetic means on said bar positioned to move closely to said elements and to impart motion to the elements which are in proximity thereto at the instant of excitation by an echo pulse.

3. In an echo sounding device, the combination of a vibratable member having a predetermined frequency, a scale having a reference point thereon adjacent said vibratable member, means for releasably retaining said vibratable member adjacent a portion of said scale, means for emitting wave impulses, means for receiving echo impulses, signalling means actuated by said receiving means for indicating the position of the vibratable member relatively to the scale at the instant an echo impulse is received by said receiving means, and means for successively releasing said vibratable member and actuating said means for emitting wave impulses in timed relation to the frequency of said vibratable member to permit the latter to move past said reference point on said scale at the instant a wave impulse is emitted and to move across said scale a distance indicative of the time elapsed between emission of said wave impulse and reception of said echo impulse before said signalling means is actuated.

4. In an echo sounding device including a transmitter, an echo pulse receiver, switching means for periodically energizing said transmitter to cause it to emit wave impulses, the combination with said echo pulse receiver of an indicator comprising a scale having a zero point thereon, a vibratable member movable along said scale, means for releasably retaining said member adjacent a portion of said scale, signalling means actuated by said receiver for indicating the position of said member relatively to said scale at the instant an echo impulse is received by said receiver, and means associated with said switching means for actuating said releasable member to permit said deflectable member to move past said zero point on said scale at the instant said switching means energises said transmitter and to move across the scale a distance indicative of the time elapsed between emission of said wave impulse and reception of said echo impulse before said signalling means is actuated.

5. An indicator for echo sounding devices which include a transmitter for emitting wave impulses, and a receiver for echo impulses, comprising a vibratable member having an end portion movable through a path at a predetermined frequency, a scale having a reference point thereon extending adjacent said path, means for releasably retaining said vibratable member with said end portion at one end of said path, means for adjusting the position of said vibratable member with respect to said reference point when said member is at said one end of said path, and means for actuating said means for releasably retaining said vibratable member and energising said transmitter to emit a wave impulse to release said vibratable member for movement of its end portion along said path and energise said transmitter as said end portion passes said reference point on said scale, and signalling means actuated by said receiver for indicating the position of said end portion relatively to said scale at the instance an echo impulse is received by said receiver.

DONALD ORR SPROULE.